United States Patent [19]
MacDonald et al.

[11] 3,886,033
[45] May 27, 1975

[54] METHOD AND APPARATUS FOR APPLYING A CUTTING STRIP TO A CONTAINER

[75] Inventors: William MacDonald; George Webb, both of Weston, Ontario; Peter Waldburger, Toronto, Ontario; Robert G. Hughes, Rexdale, Ontario, all of Canada

[73] Assignee: Continental Can Company of Canada Limited, Toronto, Ontario, Canada

[22] Filed: Nov. 6, 1972

[21] Appl. No.: 303,870

[30] Foreign Application Priority Data
Feb. 25, 1972 United Kingdom.............. 8778/72

[52] U.S. Cl. .................................. 156/522; 93/1 E
[51] Int. Cl. ...................... B32b 31/00; B31d 5/00
[58] Field of Search .......... 156/250, 256, 264, 510, 156/517, 519, 521, 522, 354–357; 93/1 E, 1 G, 1 A, 8 WA

[56] References Cited
UNITED STATES PATENTS
| | | | |
|---|---|---|---|
| 1,843,429 | 2/1932 | Marcalus | 93/8 WA |
| 2,350,244 | 5/1944 | Malhoit | 156/522 |
| 2,628,179 | 2/1953 | Bergstein | 93/8 WA |
| 2,776,068 | 1/1957 | Johnson | 156/522 |
| 2,956,612 | 10/1960 | Gaines et al. | 156/355 |
| 3,199,262 | 8/1965 | Miller et al. | 156/354 |

Primary Examiner—Douglas J. Drummond
Attorney, Agent, or Firm—Diller, Brown, Ramik & Wight

[57] ABSTRACT

A container which has a plastic cutting strip is described wherein the edge of the cutting strip is preferably serrated and the strip is adhered to the container throughout the length of the strip. An apparatus is also described for applying the strip to containers using a continuous length of strip wherein serrating means are mounted on the apparatus for serrating an edge of the strip and cutting and applying means for applying the strip to the container blank is mounted over a conveyor table downstream of a hot melt extruder providing hot melt adhesive on the container blank.

10 Claims, 16 Drawing Figures

METHOD AND APPARATUS FOR APPLYING A CUTTING STRIP TO A CONTAINER

BACKGROUND OF INVENTION

1. Field of Invention

The present invention relates to dispensing containers and particularly to a container for dispensing sheet material from a roll having improved cutting means, and the apparatus and method for applying the cutting means to the container.

2. Description of Prior Art

Heretofore, most commercial dispensing containers having cutting means include a serrated metal blade riveted to one of a wall or flange of the container with the serrated edge protruding beyond the edge of the container. Examples of these cutting means are shown in Canadian Pat. Nos. 516,550, Klause, 1955; 566,544, Burbank, 1958; 574,548, Burbank, 1959; 581,682, Annen, 1959; and 685,894, Holcombe, 1964. In any of these examples, where metal blades are used, there is a potential safety hazard since the serrated edge of the blade is usually ragged from the stamping method of forming the blade. The person using the dispenser is often apt to pass his hands over the blade when retrieving the free end of the sheet material or to accidentally rap his knuckles across the blade, thereby causing injury.

It is also customary in manufacturing such dispensers with metal cutting blades to form the blade with a stamp die and immediately rivet the blade to the carton blank. However, since a press is required for the stamping step and since a different die must be cut for every variation in length or pitch of the teeth of the blade, the operation is relatively expensive. Even in quantity production, the cost of making and adding the serrated metal blade is considerable in the per item cost of producing the carton dispenser.

Furthermore, since the metal blade is usually attached to the carton by riveting at points which are spaced apart, it is normal to find a portion of the blade at each end thereof which is unattached and thus it can be readily hooked or caught, causing the blade to be bent out of shape.

Attempts have been made to replace the metal blade on dispensing cartons by serrating the edge of a flange on the carton and then coating the edge of the carton with a plastic material, such as described in Canadian Pat. Nos. 651,799, Perkins et al, 1962, and 738,265, Finn et al, 1966. Since the teeth of the serrated edges are cut in the carton material and merely coated or impregnated with plastic resin, the edges of these teeth become unacceptably blunt and, therefore, such arrangements are not suitable for cutting certain types of sheet material.

SUMMARY OF INVENTION

It is an aim of the present invention to provide a dispenser with cutting means which is relatively less expensive to manufacture. It is also an aim of the present invention to provide a serrated plastic blade on the dispenser carton which is softer than the metal blade and, therefore, safer to use, since such rigid ragged edges as are found on steel blades will not be present on plastic blades of the present invention, thereby reducing the chances of the user being injured when handling the dispenser. It is a further aim to provide a dispenser and cutting blade wherein the blade is adhered along its full length to the carton thereby providing uniform and tight adherence of the blade throughout the length of the blade.

A construction in accordance with the present invention includes a container for dispensing selected lengths of sheet material from a roll of sheet material contained therein, an elongated opening defined in the container parallel to the axis of the roll, a serrated cutting strip of suitable flexible material provided near the opening with its axis parallel to the roll and the opening, the cutting strip being adhered throughout its length to the container and being located on the container such that the cutting edge of the strip protrudes from the container, whereby a preselected length of sheet material being passed through the opening may be severed from the continuous web of sheet material by applying tension on the web as it is being pressed against the serrated edge of the strip.

A method in accordance with the present invention includes the steps of feeding a continuous strip of plastic material, serrating at least one edge of the strip, simultaneously feeding containers to an application station, applying adhesive to one of the strip and a continuous area on the container before the application station, cutting a predetermined length of the strip, passing the strip and the container through the application station, and simultaneously applying the strip to the container with the adhesive.

An apparatus in accordance with the present invention includes means for feeding a continuous strip of plastic material, means serrating at least an edge of said strip, means for passing a plurality of containers in line, one by one, to an application station, means for applying adhesive to one of the strip and a corresponding area on the container, means for applying the strip to the container with the adhesive at the application station, means coordinating the timing of said adhesive application and means for coordinating the timing of said application of said strip to said container, means for cutting a predetermined length of said strip coordinated with the length to be applied to said container.

BRIEF DESCRIPTION OF THE DRAWINGS

Having thus generally described the nature of the invention, reference will now be made to the accompanying drawings, showing by way of illustration preferred embodiments thereof and in which.

DESCRIPTION OF PREFERRED EMBODIMENTS

A preferred tear strip B is of a plastic material of inherent physical properties, thickness, and width such that it is stiff but flexible. A typical strip is high impact polystyrene of a thickness within the range from about 0.010 inch to about 0.022 inch and the width in the neighborhood of 5/16 of an inch. The caliper of the material and the width of the strip may be varied depending on the specific use. The plastic strip material must possess the desired flexibility, rigidity and machineability to give good performance both in manufacture and in the field as a tear strip for consumer or retail use.

It should be understood that the carton design is of secondary importance, as the strip application has a wide range of uses. The strip can be smooth edged, when used, for example, as a reinforcement, as a tearing opening device, or as a reinforced carrying handle. It may be serrated on one edge or both as the occasion demands when used as a tearing device. The strip can be a continuous strip running the whole length of the carton, in any location. It can be a continuous strip shorter than the length of the carton blank or a series of strips in a line or a series of parallel strips.

The method of application of the strip may be employed with a variety of ribbon material which has the characteristics of being stiff yet flexible, for example, cloth, fiber-glass, scrim, plastics, for example, polystyrene, polypropylene, vinyl resins, butryate resins, or metal.

A preferred use of the method of the invention is in applying a plastic tear strip, and its particular use will be described in more detail by way of example. For this application, it is contemplated that the toothed edge be such that it is effective to tear a thin sheet of plastic film, paper or metal foil, but not normally tear a person's skin, as may easily occur with a metal strip if the user is not careful.

The foldable carton material from which the container is made is preferably paperboard and the surface to which the strip is applied is receptive to the adhesive. A highly lacquered or glazed surface is to be avoided.

The strip B is adhered throughout its entire length to the carton A with the serrated edge thereof protruding slightly beyond the carton. The adhesive must bond itself well to the plastic strip B and to the carton A and preferably should impregnate itself in the paperboard material.

A preferred adhesive for applying the strip to the container is a hot melt supplied by Swift & Company and known as "Z-12-022" which has best combination of bonding to the carton and the polystyrene strip. The make-up of this hot melt adhesive is substantially as follows:

| | |
|---|---|
| Ethylene vinyl acetate Elvax 210 | 42% |
| Petroleum Resin (Wingtak 95) | 25% |
| Polyethylene (Allied Chemical AC 8) | 13% |
| Paraffin Wax (I.W.L. 1255) | 19.9% |
| Butyl Hydroxy Toluene | 0.1% |

This hot melt has a congealing point of 220°F. Its viscosity at 300°F is 1250 centiposes.

Another preferred adhesive for applying the tear strip is a hot melt type of adhesive known as "H0047" put out by Industrial Adhesive. It comes in slabs of dark color with a resinous odor. It is non-aqueous. It will support combustion, but does not contain a flammable solvent. It forms a pressure-sensitive bond, having good water resistance and excellent flexibility. It is not hydroscopic. It has a storage life of up to three months, where stored in a cool place. It is usable after freezing. Its running temperature is from 300°F to 350°F. Its typical viscosity at 300°F is 6500 centiposes, at 350°F, 3,000 cps., and at 400°F, 1400 cps.

Still another preferred adhesive is sold by Industrial Adhesive Company Ltd. under the designation "H0001." Similar to the Swift "Z-12-022," this hot melt includes ethylene vinyl acetate plus lower percentages of petroleum resin polyethylene, paraffin wax and an antioxidant, such as Butyl Hydroxy Toluene. The viscosity of this hot melt at 300°F is 1500 cps.

Figure 7:
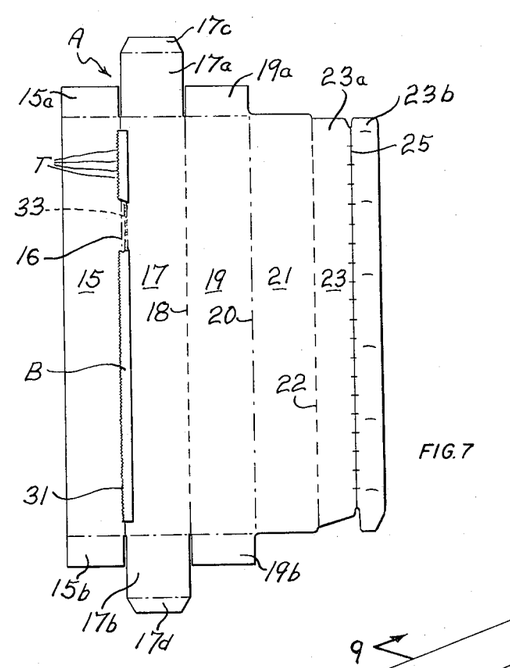
FIG. 7 is a plan view of a blank suitable for making one form of container, equipped with a tearing edge, according to the invention.
Figures 8, 9:
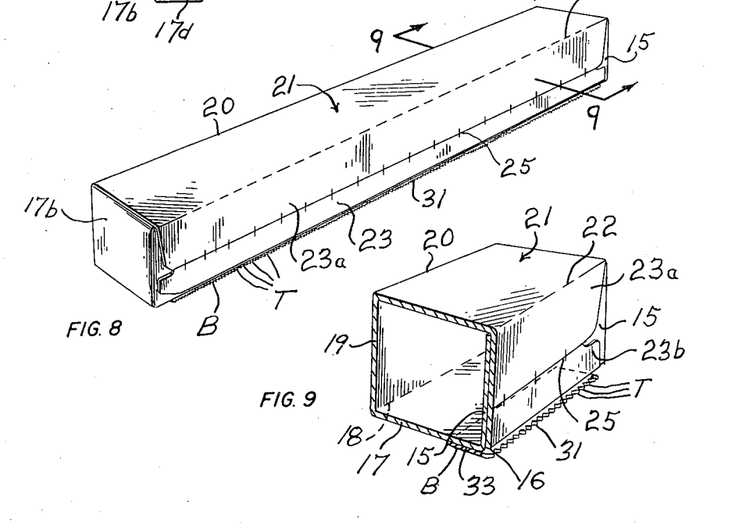
FIG. 8 is a perspective view of the container made from the blank of FIG. 7.
FIG. 9 is a vertical cross section along the line 9—9 of FIG. 8, showing particularly the relationship between the tearing strip and the material of the container.

FIGS. 7 to 9 illustrate a preferred article to which the method of the invention is applicable, namely a folding carton made of foldable paperboard equipped with a tear strip of plastic material. The carton will be described in terms of the blank from which it is made.

The parts of the blank A and their relationship are as follows. It has a first terminal panel 15, connected by a crease 16 to a second panel 17, connected by a score and skip-cut line 18 to a third panel 19, connected by a crease 20 to a fourth panel 21 and by a score and skip-cut line 22 to a terminal panel 23. The panel 15 is provided with end flaps 15a and 15b. The panel 17 is provided with end flaps 17a and 17b, in turn provided with short terminal tabs 17c and 17d. The panel 19 is provided with end flaps 19a and 19b. The panel 23 is divided into an inner part 23a and an outer part 23b by cuts 25 of the nature shown constituting a tear line by which the parts 23a and 23b may be separated.

The carton is equipped with an integral tear strip B, which may be applied according to the method of the invention. The strip B is adhesively connected to a margin of the panel 17 so that it protrudes slightly beyond the junction of this panel and the panel 15. The strip B is a narrow relatively thin strip of plastic material, the protruding edge 31 of which is provided with serrations T acting as tearing teeth. A bond of adhesive 33 is applied, for example, by the method of the invention and connects the strip B to the surface of the panel 17.

The blank A is assembled into a container as shown in FIGS. 8 and 9 as understood by one skilled in the art. This container is of the type generally used for containing and dispensing rolls of sheet material, such as paper, plastic film, metal foil and so on.

Figure 10:
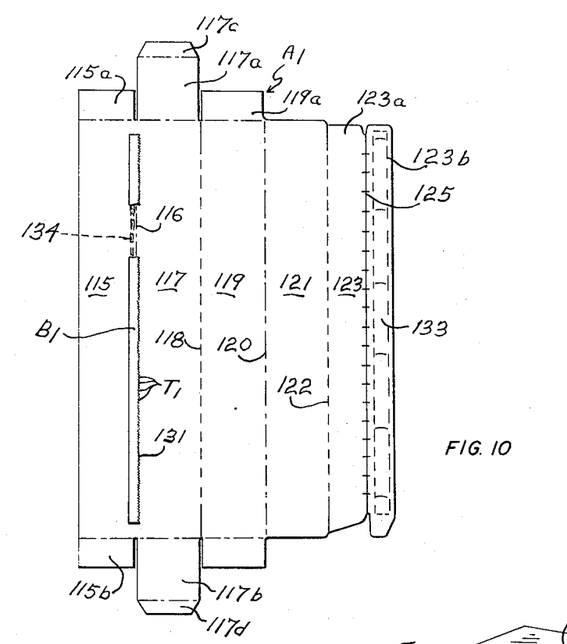
FIG. 10 is a plan view of a blank suitable for making another form of container according to the invention.
Figures 11, 12:
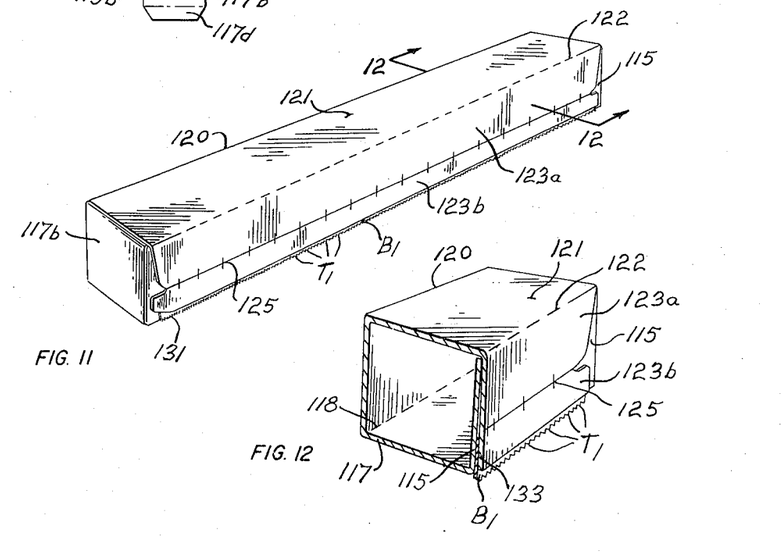
FIG. 11 is a perspective view of a container made from the blank of FIG. 10.
FIG. 12 is a vertical cross section along the line 12—12 of FIG. 11.

An alternative form of carton A1, made according to the invention, is shown in FIGS. 10 to 12. This carton has a similar construction to that shown in FIGS. 7 to 9, so similar numbers have been given to the parts, but the reference numerals have all been raised by 100. A tear strip B1 is sandwiched between the part 123b of the panel 123 and the underlying panel 115. The panel B1 has adhesive bonds 133, 134 to the part 123b and the part 115. The strip 131 protrudes from between these two panels and projects slightly beyond the edge of the panel 117 to expose its teeth T1.

Figure 13:
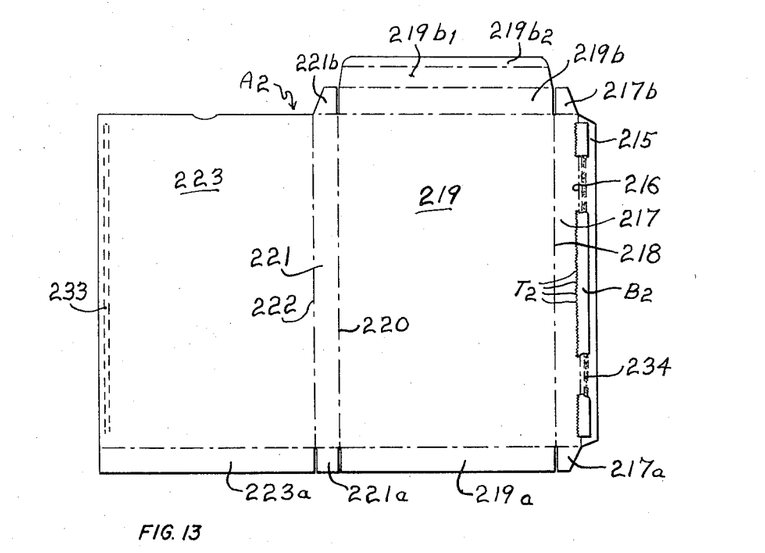
FIG. 13 is a plan view of a blank suitable for making another form of container according to the invention.
Figures 14, 15:
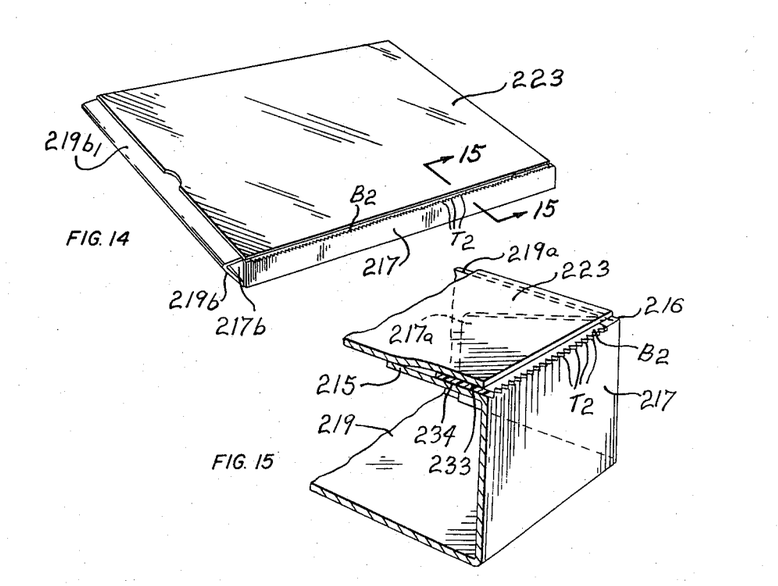
FIG. 14 is a perspective view of a container made from the blank of FIG. 13.
FIG. 15 is a vertical cross section along the line 15—15 of FIG. 14.

A further alternative form of carton, made according to the invention, is shown in FIGS. 13, 14 and 15. A blank A2 is made up of a narrow panel or flap 215, connected by a crease 216 to a narrow panel 217, connected by a crease 218 to a wide panel 219, connected by a crease 220 to a narrow panel 221, connected to a wide panel 223 by a crease 222. The panel 219 is provided with end flaps 219a and 219b, 219b1 and 219b2. The panel 217 is provided with end flaps 217a and 217b. The panel 221 is provided with end flaps 221a and 221b. Creases serve to hinge the flaps to their panels. The tear strip B2 is adhesively applied to the panel 215.

The blank is assembled into a container as shown in FIG. 14. The tear strip B2 is sandwiched between the panel 223 and the panel 215 and held to each of these panels by adhesive bonds 233 and 234, respectively. The tear strip B2 projects beyond the panels 223 and 217 so that its teeth T2 are exposed.

The carton of FIGS. 13 to 15 is particularly useful for containing material in bags of sheet material which may be difficult to open. One such carton is used for plastic bags containing dog food. The bags are removed from the carton and sheet material torn on the tear strip. While in the carton shown, the tear strip runs the entire width of the carton, it might only run part of the width, for example, along the central part of the edge of the panel 223 or there might be several strips spaced apart along the edge of the panel 223.

FIGS. 1 through 6a show a preferred apparatus for applying the continuous plastic strip B to the cartons in blank form.

Figure 1:
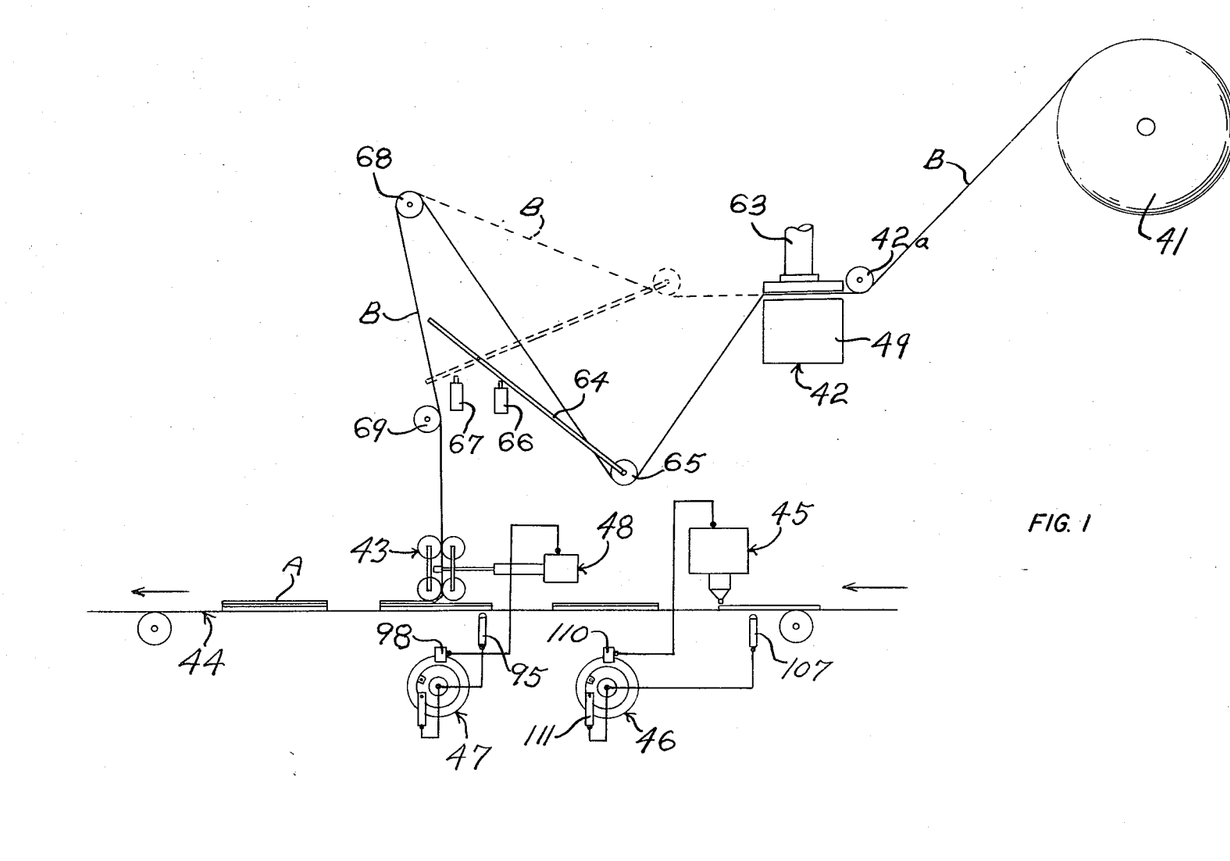
FIG. 1 is a schematic diagram showing a preferred apparatus for carrying out the method of the invention.

Referring to FIG. 1, a blank plastic strip B is drawn from a storage roll 41 and passed through a tooth cutter 42 which provides a serrated edge on the strip B forming cutting teeth. The strip B is then passed through an applicator and cutting housing 43 which applies and cuts individual strips from the continuous strip B onto the blanks A passing on a conveyor table 44. Previous to the plastic strip application step and upstream therefrom is an adhesive extruder 45, which provides an elongated continuous area of hot melt adhesive onto the blank of the carton A for receiving the plastic strips B. A timing device 46 for actuating the adhesive extruder is provided which detects each carton blank A as it approaches the extruder 45.

Similarly, a timing device 47 with suitable senser detects the carton blanks A as they approach the application station for coordinating the operation of the applicator 43 with the cutter for cutting the individual blades of plastic from the continuous strip B.

Figure 2:
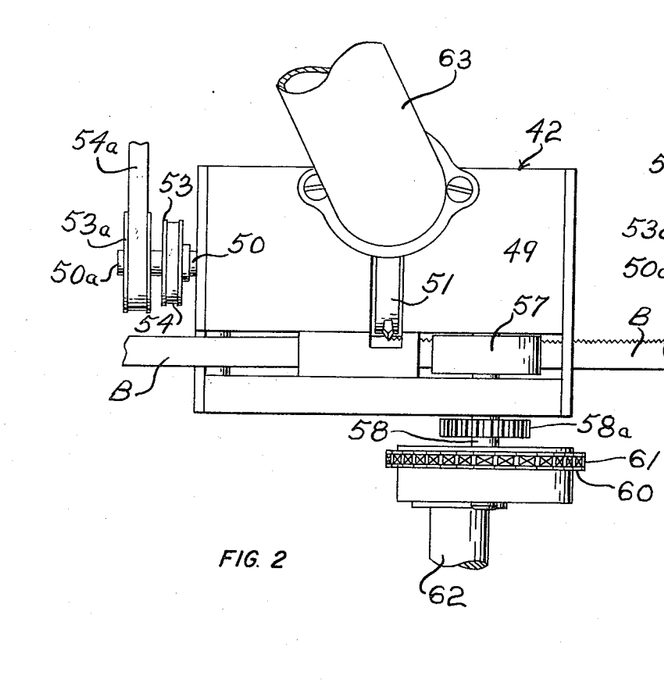
FIG. 2 is a top plan view of a detail of the apparatus shown schematically in FIG. 1.
Figure 3:
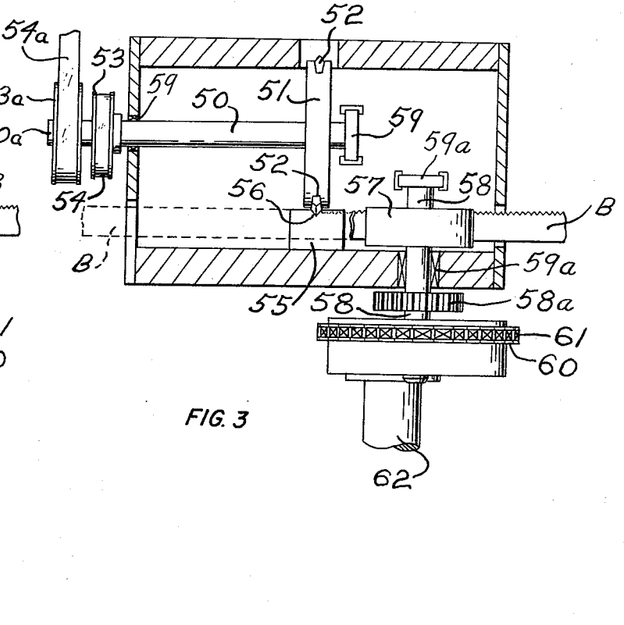
FIG. 3 is a horizontal cross section taken through the detail of the apparatus shown in FIG. 2.

Referring now to FIGS. 2 and 3, there is shown the tooth cutter 42 which includes a housing 49. A guide roll 42a aligns the strip B as it enters a suitable opening in the housing 49. A shaft 50 extends within the housing parallel to the course of the strip B and is journalled in bearings 59 in the housing. A fly cutter 51 with diametrically-opposed arms is fixed to the shaft 50 and in the present case mounts V-shaped carbide tips 52 at each end thereof. It is understood, however, that the tips 52 are replaceable and may be of different shapes. The shaft 50 is driven by a belt 54 passing about a pulley 53. The belt 54 is in turn driven by a shaft 50a turning a pulley (not shown) about which the belt 54 passes. The shaft 50a is in turn driven by a guide belt 54a passing about a pulley 53a on the shaft 50a.

A second shaft 58 is journalled in bearings 59a. The shaft 58 mounts a fixed drive roll 57 for feeding the strip B. A similar drive roll is mounted directly underneath roll 57 and is not shown in these drawings. The other roll 57 is, however, driven by means of a gear 58a which meshes with a similar gear on the shaft mounting the other drive roll 57.

Shaft 58 is driven by means of a chain 61 passing over sprocket 60 fixed to the shaft. The chain 61 is in turn driven by a further sprocket (not shown) fixedly mounted to a drive shaft 62.

Finally, a vacuum exhaust pipe 63 is shown in FIG. 2 for drawing out dust and plastic particles within the housing 49.

The strip as it is driven by the rolls 57 passes about a freely-rotating roll 65, shown in FIG. 1, mounted on the end of a pivoting lever 64. The lever 64 senses the slack in the strip B and either stops or starts the drive operating the driven rolls 57. When there is too much slack in the strip B, the lever 64 will take up the position as shown in full lines in FIG. 1, thereby engaging the microswitch 66, causing the drive to the rolls 57 to be disengaged. As the strip B is being fed by means of the applicator 43, the slack in the strip B is reduced so that it assumes a position shown in dotted lines in FIG. 1, thereby causing the lever 64 to engage the microswitch 67, thereby reactivating the drive to the drive rolls 57.

The strip B passes over an idler roller 68 and then down to the applicator 43 past an aligning roller 69 and then enters an applicator and cutter housing 43 as shown in more detail in FIGS. 4, 5, 6 and 6a.

The applicator and cutter housing 43 includes a fixed block 70 mounted to the frame of the apparatus. The fixed block 70 mounts a pair of spaced-apart driven rollers 73, 74 and a nip roller 74a is provided below roller 74 for passing the carton and strip therebetween. Slide guide brackets 72 are provided between the rollers 73, 74 and between the bracket 71 and roller 73 for aligning and holding the strip B. A shear block 75 is provided on the fixed block midway thereof and includes a slit 75a through which the strip passes. Finally, an arcuate guide member 79 is provided at the lower end of the fixed block 70 to deflect the path of the strip B onto the cartons A between rollers 74 and 74a. Each driven roller 73 and 74 includes a shaft 76a and a shaft 77a and sprockets 76 and 77, respectively, about which a chain 78 passes. On the shaft 77a, there is mounted a drive gear 90 which meshes with a drive gear 91 to drive the various rollers in the applicator 43.

Figure 4:
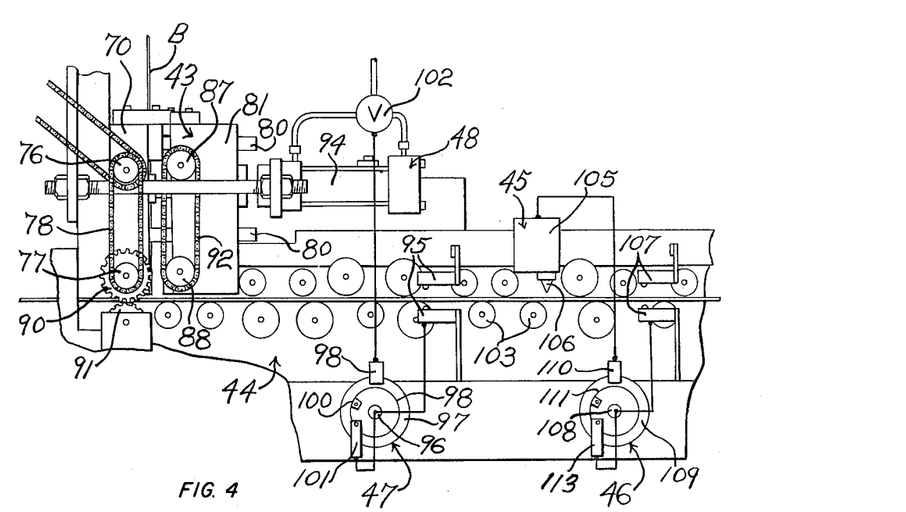
FIG. 4 is a fragmentary side elevational view of the apparatus shown schematically in FIG. 1, with the electrical circuits shown diagrammatically thereon.
Figure 5:
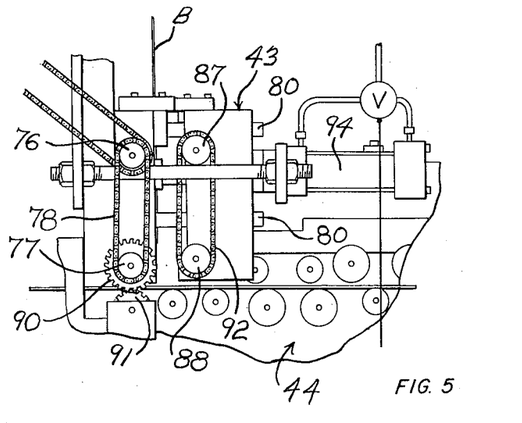
FIG. 5 is a fragmentary elevational view of a portion of the apparatus shown in FIG. 4 in a different operating position.

Four guide rods 80 are mounted to the fixed block 70 and in turn mount a block 81 for sliding movement. Block 81 includes idler pressure rollers 82 and 83 which are adapted to engage the driven rollers 73 and 74 of the fixed block 70 and the strip B. A knife blade 84 is fixed to the sliding block 81 and includes an opening 85 with a cutting edge 86 therein. The cutting knife 84 operates in shearing relationship with the shear block 75 for cutting the strip B as it passes therethrough when the sliding block 81 is moved, as will be described further. The rollers 82 and 83 are mounted on shafts 87a and 88a which in turn mount sprocket wheels 87 and 88. A chain 92 passes about the sprockets 87 and 88 to coordinate the movement thereof. A piston 93 and a cylinder 94 are fixed to the frame of the apparatus and operatively move the sliding block 81. When the piston is fully extended, the sliding block 81 is in a position as shown in FIG. 4, whereby the pressure rolls 82 and 83 are pressed against the rolls 73 and 74, thereby driving the four rolls together and moving the strip B downwardly. As the piston 93 is retracted into the cylinder 94, the cutting edge 86 of the cutting blade 84 shears the strip against the shear block 75 and at the same time, the rolls 82 and 83 are disengaged from the rolls 73 and 74 and thus the strip is no longer fed forward.

Figure 6:
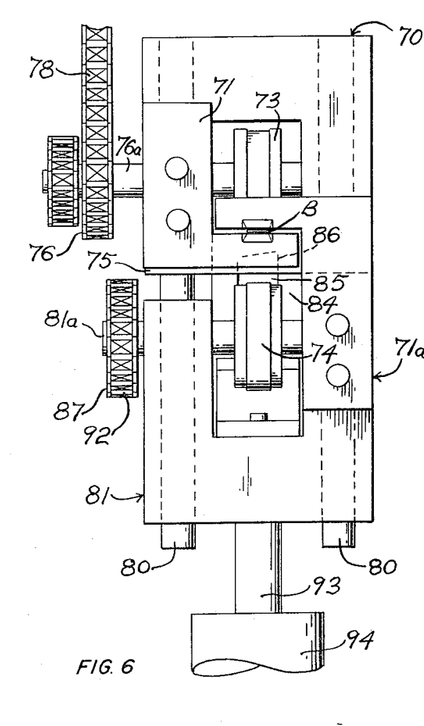
FIG. 6 is a top plan view of the detail of the invention shown in FIGS. 4 and 5.
Figure 6A:
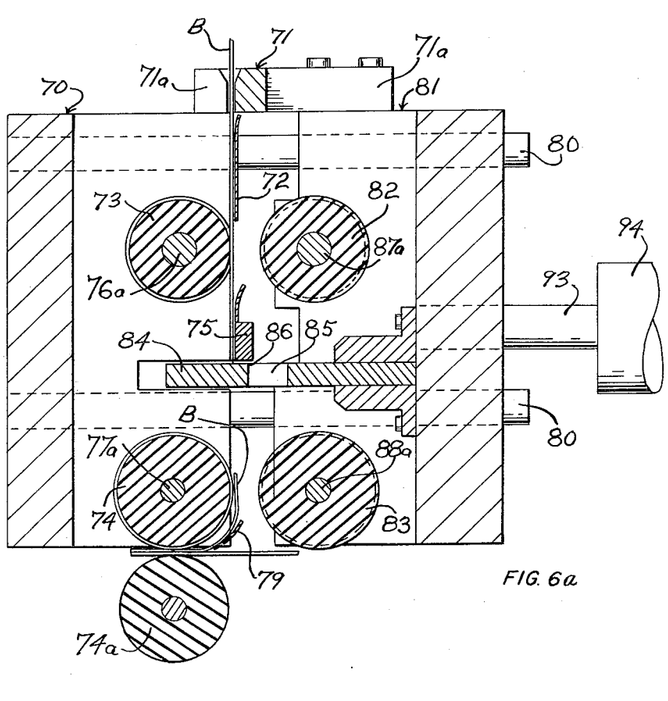
FIG. 6a is a vertical cross section taken through a detail of the operation shown in FIG. 5.

L-shaped arms 71 and 71a are mounted on blocks 70 and 81 respectively. When the block 81 is pulled away from block 70, the L-shaped arms 71 and 71a engage the strips B as shown in FIG. 6 in order to hold the end of strip B after it has been cut. However, it is also contemplated that a solenoid operated clamp could be used to grip the strip.

The piston 93 and cylinder 94 are operated by an air valve 102 which in turn is actuated electronically by means of a fiber-optic device 98.

Photo-electric cells 95 are provided on either side of the conveyor and detect the forward edge of an oncoming carton blank A. A signal is sent to an electronically-operated clutch at 96 which engages and drives a disc 97 on which there is mounted a length of light-colored strip 99 which is equal to the length of strip to be applied to the carton A. The fiber-optic device 98 detects the light-colored strip and sends a signal to the air valve 102, causing the piston to be fully extended so that the rolls 82 and 83 engage the strip B with the rolls 73 and 74 and feed a length of strip B onto the carton. As the fiber-optic device 98 reads the trailing edge of the light-colored strip on the disc 97, it causes the air valve to reverse, thereby retracting the piston 93, causing the strip B to be disengaged by the rolls 82 and 83 and to be cut by the cutting blade 84.

A secondary photo-electric cell arrangement 101 is provided to disengage the electronic clutch as the aperture 100 on the disc 97 comes in line with the photo-electric cell 101, thereby setting up the disc in the proper initial position for the next signal from the photo-electric cells 95.

Upstream from the photo-electric cells 95 are a pair of photo-sensitive cells 107 which also detect the front edge of the carton A. Once the carton A is detected, a signal is sent to an electronic clutch identified at 108, thereby engaging the disc 109 and forcing it to rotate. A similar light-colored strip 111 is provided on the periphery of the disc 109 and the fiber-optic device 110 sends a signal to the adhesive extruder housing 105, forcing hot melt adhesive through the nozzle 106 and to the carton for a length of area determined by the length of light-colored strip 111 on the disc 109. Once the fiber-optic device 110 reads the trailing edge of the strip, the extruder is shut. Finally, the photo-electric device 113 signals the electronic clutch to disengage the disc 109 when the aperture 112 is in line therewith.

There are many other ways of preparing a carton with a plastic strip having a serrated cutting edge to replace the metal cutting blade and to provide a continuous length of adhesive between the blade or strip and the carton. The above is merely a preferred apparatus and method for applying the strip.

We claim:

1. An apparatus for applying a flexible cutting strip to a container from a continuous roll which includes means for feeding a continuous strip of a material, conveying means for passing a plurality of containers in line one by one, through an application station, an adhesive extruder located adjacent the conveying means for applying adhesive to one of the continuous strip and a corresponding area on the container, means for cutting a predetermined length of the continuous strip to be applied to the container, means for applying the cut predetermined length of strip to the container with the adhesive at the application station, means for forming a serrated edge continuously along one edge of the strip provided upstream of said cutting means, means coordinating the application of adhesive and means for coordinating the application of the predetermined lengths of strip to each container.

2. An apparatus as defined in claim 1 wherein the containers are fed in a flat blank form on a conveying means and the means for applying the adhesive includes an adhesive extruder located adjacent the conveying means and adapted to provide an elongated area of adhesive on a predetermined area on the blank.

3. An apparatus as defined in claim 2 wherein the extruder is operative with hot melt adhesive and is located above the conveying means.

4. An apparatus as defined in claim 1 wherein the means for forming a cutting edge on the continuous strip includes a shearing plate with a shaped recess on one edge thereof, press rolls engaging opposite sides of the strip for advancing it through the cutting means, a housing mounting the shear plate and the press rolls, a driven shaft mounted in the housing and fly cutting arms on the shaft including cutting tips on the ends of the arms conforming to the shape of the recess in the shear plate, and adapted to pass in close proximity to the edges of the shear plate forming the recess, thereby serrating the strip as it is being advanced by the press rolls.

5. An apparatus as defined in claim 1 wherein the application station includes a first movable surface mounted above the conveyor means and a second movable surface mounted on a bracket movable to and from the first movable surface, drive means for driving one of said movable surfaces and means for pressing the second movable surface against the first movable surface for engaging the strip and feeding it onto a container and a cutting blade arranged on the bracket mounting the second movable surface such that it will sever the strip when a predetermined length of the strip has been moved by the first and second movable means.

6. An apparatus as defined in claim 5 wherein the application station includes a first frame member, a pair of driven rollers mounted on the frame member, a strip feeding path being defined tangent to the peripheries of said rollers, a second frame member movable relative to the first frame member mounting a pair of rollers such that when the frames are in close proximity the rollers on the movable frame will engage the rollers on the fixed frame for feeding the strip.

7. An apparatus as defined in claim 6 wherein the cutting blade includes a blade defining an aperture in the blade having a cutting edge, said blade being mounted on the moving frame and adapted to move with the movable frame in shearing cooperation with a shearing block on the fixed frame for cutting the strip as the movable frame is retracted.

8. An apparatus as defined in claim 1 wherein the means for coordinating the application of adhesive includes sensing means for sensing the leading edge of a container blank as it is being advanced on the conveyor means, signal means for operating an adhesive extruder located adjacent the conveying means in response to the sensing means, means for measuring the amount of time that the extruder is to be operated.

9. An apparatus as defined in claim 6 wherein the means for coordinating the application of the strip to the container includes the piston and cylinder arrangement for positively moving the movable frame from a disengaged retracted position to a position in close proximity with the fixed frame, sensing means for sensing the leading edge of a container blank as it is being advanced on the conveyor means, signal means responsive to the sensing means for actuating the piston and cylinder arrangement to move the movable frame into close proximity with the fixed frame and means for measuring the amount of time that the movable frame is to be in close proximity with the fixed frame.

10. An apparatus as defined in claim 8 wherein the means for measuring the amount of time includes an electronically-operated clutch responsive to a signal from said sensing means, a disc driven through said clutch, a strip of light-colored material mounted on the periphery of said disc corresponding to the length of the area on which adhesive is to be applied on the container, fiber-optic means sensitive to provide said signal as the length of light-colored material on the periphery of the disc passes thereby, whereby said fiber-optic means will terminate said signal as it reads the trailing edge of the light-colored material.

* * * * *